United States Patent
Shah et al.

(10) Patent No.: US 10,475,222 B2
(45) Date of Patent: Nov. 12, 2019

(54) AUTOMATIC CREATION OF A GROUP SHOT IMAGE FROM A SHORT VIDEO CLIP USING INTELLIGENT SELECT AND MERGE

(71) Applicant: ADOBE INC., San Jose, CA (US)

(72) Inventors: Abhishek Shah, Delhi (IN); Andaleeb Fatima, Noida (IN)

(73) Assignee: Adobe Inc., San Jose, CA (US)

( * ) Notice: Subject to any disclaimer, the term of this patent is extended or adjusted under 35 U.S.C. 154(b) by 73 days.

(21) Appl. No.: 15/695,924

(22) Filed: Sep. 5, 2017

(65) Prior Publication Data

US 2019/0073811 A1     Mar. 7, 2019

(51) Int. Cl.
| | |
|---|---|
| *G06K 9/36* | (2006.01) |
| *G06T 11/60* | (2006.01) |
| *G06K 9/00* | (2006.01) |
| *G06T 7/73* | (2017.01) |

(52) U.S. Cl.
CPC ............ *G06T 11/60* (2013.01); *G06K 9/0061* (2013.01); *G06K 9/00248* (2013.01); *G06K 9/00281* (2013.01); *G06K 9/00288* (2013.01); *G06K 9/00308* (2013.01); *G06K 9/00744* (2013.01); *G06T 7/73* (2017.01); *G06T 2207/10016* (2013.01); *G06T 2207/20221* (2013.01);

(Continued)

(58) Field of Classification Search
CPC ............ G06K 9/00308; G06K 9/6201; G06K 9/00248; G06K 9/00281; G06K 9/00677; G06K 9/00744; G06K 9/036; G06K 9/4671; G06K 9/6202; G06T 11/60; G06T 2207/10016; G06T 2207/10024; G06T 2207/30201; G06T 5/005; G06T 5/50

See application file for complete search history.

(56) References Cited

U.S. PATENT DOCUMENTS

| | | | |
|---|---|---|---|
| 7,659,923 B1 * | 2/2010 | Johnson ................ | G03B 17/00 348/218.1 |
| 10,061,977 B1 * | 8/2018 | Chang ................ | G06K 9/00308 |

(Continued)

FOREIGN PATENT DOCUMENTS

WO    WO-2008099627 A1 *   8/2008 ............... G06T 5/50

*Primary Examiner* — Bhavesh M Mehta
*Assistant Examiner* — Ian L Lemieux
(74) *Attorney, Agent, or Firm* — Brake Hughes Bellermann LLP

(57) ABSTRACT

Systems and techniques are disclosed for automatically creating a group shot image by intelligently selecting a best frame of a video clip to use as a base frame and then intelligently merging features of other frames into the base frame. In an embodiment, this involves determining emotional alignment scores and eye scores for the individual frames of the video clip. The emotional alignment scores for the frames are determined by assessing the faces in each of the frames with respect to an emotional characteristic (e.g., happy, sad, neutral, etc.). The eye scores for the frames are determined based on assessing the states of the eyes (e.g., fully open, partially open, closed, etc.) of the faces in individual frames. Comprehensive scores for the individual frames are determined based on the emotional alignment scores and the eye scores, and the frame having the best comprehensive score is selected as the base frame.

20 Claims, 6 Drawing Sheets

(52) U.S. Cl.
CPC ............... *G06T 2207/30168* (2013.01); *G06T 2207/30201* (2013.01)

(56) References Cited

U.S. PATENT DOCUMENTS

| | | | | |
|---|---|---|---|---|
| 2004/0223649 | A1* | 11/2004 | Zacks | G06T 11/00 382/218 |
| 2008/0037841 | A1* | 2/2008 | Ogawa | H04N 5/232 382/118 |
| 2010/0066840 | A1* | 3/2010 | Asukai | G06T 5/50 348/207.1 |
| 2011/0013038 | A1* | 1/2011 | Kim | G06K 9/00228 348/222.1 |
| 2011/0141258 | A1* | 6/2011 | Song | G06K 9/00268 348/77 |
| 2011/0268369 | A1* | 11/2011 | Richards | G06T 5/005 382/284 |
| 2014/0369627 | A1* | 12/2014 | Huang | G06T 5/50 382/309 |
| 2017/0032178 | A1* | 2/2017 | Henry | G06T 11/60 |
| 2017/0098122 | A1* | 4/2017 | el Kaliouby | A61B 5/744 |
| 2018/0157902 | A1* | 6/2018 | Tu | G06K 9/00335 |
| 2018/0204097 | A1* | 7/2018 | Karki | G06K 9/00281 |
| 2018/0300851 | A1* | 10/2018 | Elor | G06T 3/0093 |
| 2019/0057723 | A1* | 2/2019 | Ho | G06F 16/583 |

* cited by examiner

10,475,222 B2

AUTOMATIC CREATION OF A GROUP SHOT IMAGE FROM A SHORT VIDEO CLIP USING INTELLIGENT SELECT AND MERGE

TECHNICAL FIELD

This disclosure relates generally to computer-implemented methods and systems and more particularly relates to improving the efficiency and effectiveness of photo editing computing systems.

BACKGROUND

Group photography is a challenging genre of photography. For group shots, photographers desire to have all of the faces aligned with one another (preferably, looking into the camera or in the same direction), consistent smiles/expressions, and open eyes. Since it is difficult to capture pictures of groups of people having these or other desirable facial features, photographers frequently engage in tedious manual photo manipulations to create such images. For example, a professional photographer may shoot short clips to capture fleeting moments when people are arranging themselves. The professional photographer then reviews these clips to manually identify the best frame to use as the group photo and may attempt to manually correct issues in that image.

Conventional photo editing applications do not adequately facilitate such selections and corrections of group shots. Where the clip includes more than a few frames, there is no way to present the user with all of the frames for visual comparison with one another. Users are generally left to select from a small subset of a potentially larger set of frames from a clip. Users also generally end up making subjective guesses about which frame is best based on observing a one or a few attributes in a few of the frames and are unable to objectively compare all frames with respect to multiple, relevant attributes. In addition, there is often no one frame of a clip where all of the desirable attributes are present for all of the faces. The photographer must then manually tweak the facial features (eyes, smiles, face orientation, etc.) of each face. Existing systems do not facilitate the use of features found in the faces in other frames and instead rely upon the photograph's sophistication and ability to perform subjective and manual revisions. Existing systems thus generally require that the user perform processes that are manual, subjective, and tedious, that often require sophisticated knowledge of photo editing tools, and that often provide unsatisfactory results.

SUMMARY

Systems and techniques are disclosed herein for automatically creating a group shot image by intelligently selecting a best frame of a video clip to use as a base frame and then intelligently merging features of other frames of the video clip into the base frame. In an embodiment of the invention, a video clip of frames is identified for use in automatically creating the group shot image. A base frame selector determines emotional alignment scores and eye scores for the individual frames of the video clip. The emotional alignment scores for the frames are determined by assessing the faces in each of the frames with respect to an emotional characteristic (e.g., happy, sad, neutral, etc.). The eye scores for the frames are determined based on assessing states of the eyes (e.g., fully open, partially open, closed, etc.) of the faces in the individual frames. The base frame selector then determines comprehensive scores for the individual frames based on the emotional alignment scores and the eye scores, and selects the frame having the best score to use as the base frame for a group shot image.

Embodiments of the invention additionally, or alternatively, merge features from other frames of the video clip into a base frame to create a group shot image based on the base frame. In an embodiment, this involves a feature merging module determining face scores for the faces in the base frame. These face scores are determined based on scoring the faces in the base frame with respect to alignment with an emotional characteristic and eye state. These face scores are used to identify features of faces in the base frame for replacement. The feature merging module then determines replacement features in other frames of the video clip, for example, based on proximity of the other frames of the video clip to the base frame and/or detecting visibility of the replacement features in those frames. Once the replacement features are identified, those features are merged into the base frame to create the group shot image.

These illustrative features are mentioned not to limit or define the disclosure, but to provide examples to aid understanding thereof. Additional techniques are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
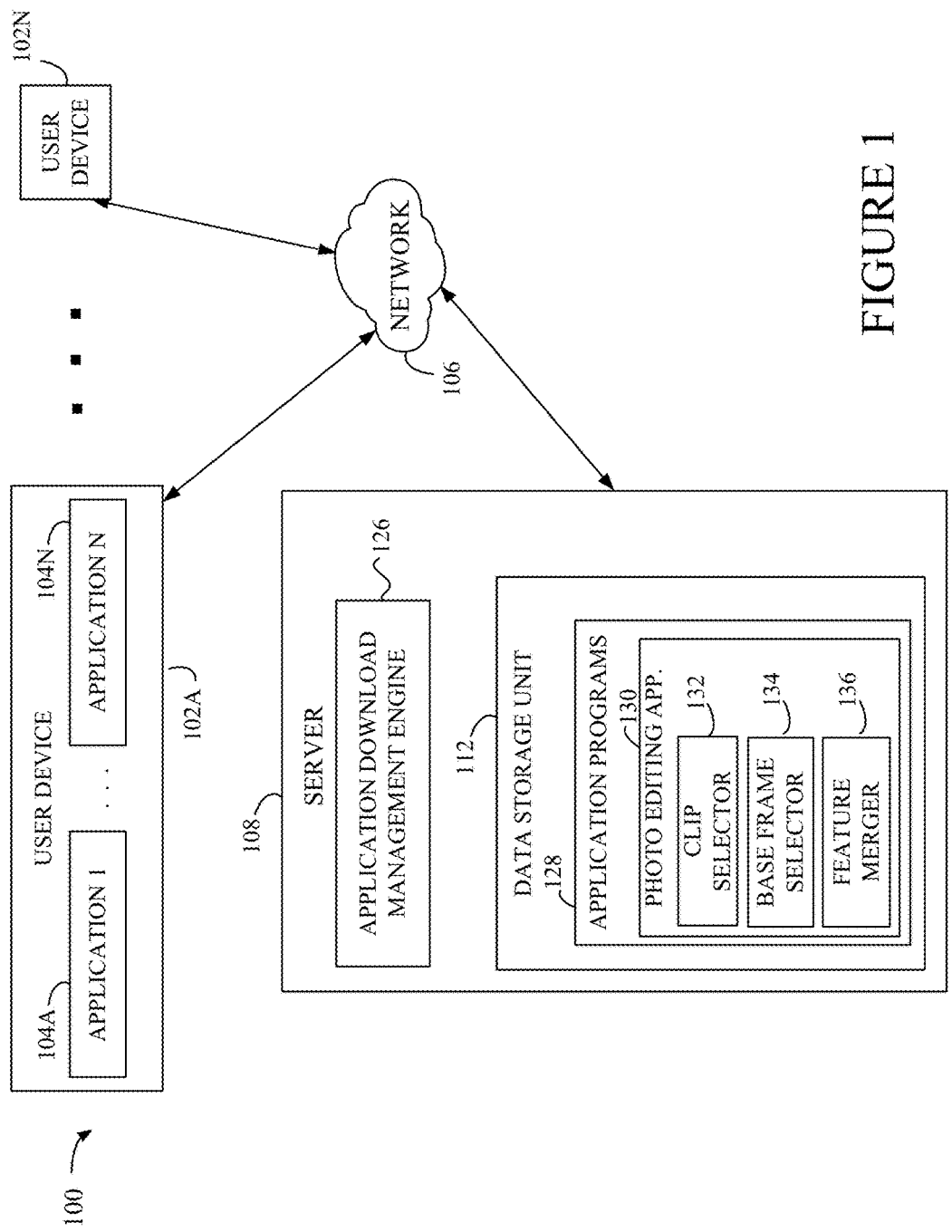
FIG. 1 illustrates an exemplary computer network environment in which techniques for creating a group shot image can be implemented.

As described above, conventional photo editing systems do not adequately facilitate creating group shot images. Embodiments of the invention address these and other deficiencies of conventional systems by providing a photo editing system with capabilities to objectively and comprehensively assess information in different frames of a short video clip to produce a group shot image that has the desirable attributes from multiple frames. Embodiments of the invention are able to automatically create such a group shot image by intelligently selecting a best frame to use as a base frame and then intelligently merging features of other frames into that base frame.

Embodiments of the invention select a best frame from a short video clip to use as a base image. Each frame in the clip is evaluated with respect to whether the faces are aligned towards the camera, whether the faces have features that are aligned emotionally (e.g., happy, sad, neutral, etc.), the quality of the faces with respect to blurriness, lighting, and/or exposure, and/or whether the eyes of the faces are opened or closed. One or more of these evaluations result in scores that are combined or otherwise used to determine a comprehensive score for each of the frames of the clip. The frame having the best score is selected to be used as the base frame for the group shot image.

Given a base frame selection, embodiments of the invention additionally or alternatively intelligently merge attributes from other frames into the selected base frame to improve its facial feature attributes. To do so, the attributes of each face in the base image are assessed to determine whether to replace each facial feature or not. In an embodiment of the invention, this involves comparing the score of each face to the weighted average score of the faces in the base frame. If a respective face's score is less than the weighted average score, one or more of the attributes (e.g., eyes, smile, etc.) of that face are replaced using better attributes from another frame in the video clip. In an embodiment of the invention, selecting the features from one of the other frames involves finding the nearest frame in the clip that has a sufficiently high score and/or in which the features are completely visible. After merging the better features from other frames, the resulting group shot image has desirable attributes. The result can be a group shot image having the maximum number of faces with the best facial features, obtained using a minimum amount of merging, and the best overall quality. Moreover, the selection of the base frame and/or the merging of features is objectively performed by automated processes that are able to evaluate and comprehensively consider more frames, features, and criteria than is possible with the subjective, manual processes that were required by conventional systems. Even unsophisticated users are able to create group shot images having desirable attributes, for example, by providing a video and selecting a single user interface command.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "video" refers to a series of consecutive or sequenced images, i.e., frames, captured from a video camera or other image recording device. A video clip can be, but is not necessarily, a part of a longer video recording. The phrase "frame" refers to one of the images of a video clip.

As used herein, the phrase "group shot image" refers to an image that depicts a group of two or more people. A group shot image can, but does not necessarily, include the one or more of the faces of the people. Embodiments of the invention create group shot images based on video clips by selecting a base frame of the video clip to use and/or merging eyes, mouths, and/or other facial features from other frames into the selected base frame.

As used herein, the phrase "emotional alignment score" refers to a numerical value or other representation of how well a face or frame matches an emotional characteristic. For example, based on determining that a face is smiling, an emotional alignment score of the face to the emotional characteristic "happy" can be determined. For example, the smiling face can be assigned a score of 1 and the happy emotion assigned a value of 1 and the emotional alignment score of the face will reflect that the face aligns with the emotional characteristic since 1 equals 1. Conversely, a frowning face can be assigned a score of −1 and the emotional alignment score of the face will reflect that the face does not align well with the happy emotional characteristic since −1 differs from 1. An emotional alignment score can reflect whether there is such a difference and/or the magnitude of such a difference, depending upon the implementation.

As used herein, the phrase "eye score" refers to any numerical value or other representation determined based on assessing the state of the eyes of a face. For example, an eye score can be determined based on face and eye detection technology that determines whether eyes are completely open, partially open, or closed.

As used herein, the phrase "merging" refers to incorporating or otherwise using features from one frame of a video clip to change the appearance of another frame of the video clip, such as a selected base frame. In one example, merging involves replacing a mouth of the base frame with a mouth from another frame and blending or otherwise filtering one or more areas to correct for discontinuities and/or other appearance issues caused by the replacement.

FIG. 1 is a diagram of an environment 100 in which one or more embodiments of the present disclosure can be practiced. The environment 100 includes one or more user devices, such as a user device 102A up to a user device 102N. Each of the user devices is connected to a server 108 via a network 106. Users of the user devices 102A-N use various applications 104A-N or services provided by, or supported by, the server 108 via the network 106. The user devices 102A-N correspond to various users. Examples of the users include, but are not limited to, creative professionals or hobbyists who use creative tools to generate, edit, track, or manage photos and other creative content. Examples of the user devices 102A-N include, but are not limited to, a personal computer (PC), tablet computer, a desktop computer, a processing unit, any combination of these devices, or any other suitable device having one or more processors. Each user device includes at least one application supported by the server 108. Examples of the network 106 include, but are not limited to, internet, local area network (LAN), wireless area network, wired area network, wide area network, and the like.

The server 108 includes one or more engines. The server 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The server 108 also includes a data storage unit 112. The data storage unit 112 can be implemented as one or more databases or one or more data servers. The data storage unit 112 includes data that is used by the engines of the server 108.

User device 102A includes one or more applications 104A-N downloaded from server 108 using application download management engine 126. For example, user device 102A accesses the application download management engine 126 to download one or more application programs 128 for local use as applications 104A-N. Specifically, the user device 102A downloads photo editing application 130. Photo editing application 130 includes executable or other electronic content that provides a user interface for displaying, editing, printing, and/or publishing photographs. To simplify the illustration, such features are omitted from FIG. 1.

In addition, the photo editing application 130 includes several modules of executable code or other computer-readable instructions that provide functions useful to create group shot images according to one or more of the embodiments of the invention. The clip editor module 132 includes executable code or other computer-readable instructions that facilitate the identification of a video clip. In an embodiment of the invention, the clip selector 132 presents an interface that receives input from a user specifying a particular video clip. For example, the user can provide input specifying a local or remote file storage location at which the video clip is stored. In another embodiment, the user interface displays thumbnails or other icons representing video clips stored in an inventory associated with the user device 102A or an account associated with the user and allows the user to select a video clip from those video clips. In an embodiment of the invention, the clip selector 132 performs an automatic process to identify a video clip from a longer recording. For example, the clip selector can receive a 15 second recording and select a 4 second video clip from within the recording based on the frames of that 4 second clip including a consistent number of faces. In an embodiment, such a process receives a recording, determines multiple video clips within the recording, presents icons representing those video clips, and receives user input selecting one of the video clips to use as an input in a group shot creation process.

The photo editing application 130 also includes a base frame selector 134. This module includes executable code or other computer-readable instructions that performs or facilitates the selection of a base frame from a video clip for use in creating a group shot image. The base frame selector 134 is configured to analyze frames of the video clip based on emotional alignment, eye state, face quality, and/or other criteria including but not limited to the criteria discussed in the exemplary embodiments of FIGS. 2-5 and elsewhere in this specification. The criteria applied by the base frame selector 134 can be based on default criteria, user-specified criteria, and/or depend upon the nature of the video clips. For example, a user can specify weightings based on the user's personal preference that specifies that eye state will be more important than emotional alignment, that emotional alignment will not be used as a criterion, etc.

The photo editing application 130 also includes a feature merger 136. This module includes executable code or other computer-readable instructions that performs or facilitates the merging of features from other frames of a video clip into a base frame selected for the video clip. This module can be used in various circumstances including circumstances in which a base frame is automatically selected and circumstances in which a base frame is manually selected. The feature merger 136 assesses the faces in the base frame to determine which faces should be replaced. For example, faces that are assessed and assigned a score below a particular threshold can be identified for replacement. In an embodiment, the faces are automatically identified for replacement and the user provides input to confirm whether each of the identified faces should be modified, for example, by selecting a check box or bounding box associated with each such face.

The feature merger 136 executes algorithms and/or employs artificial intelligence to modify the features on a base image based on features from one or more of the other frames. The features in the other frames that are used for these replacements can be selected based on criteria, such as the proximity of the other frames in the clip and/or the visibility of the features on the face in the other frames. Once the replacement features are identified, such features can be used in various automated replacement and image enhancement procedures. Such processes involve replacing pixels or groups of pixels from the base frames with pixels or groups of pixels from the replacement frames. Such processes can additionally or alternatively involve blending, smoothing, filtering, or otherwise automatically adjusting the pixels of the base image to ensure continuity and otherwise provide desirable appearance attributes.

The clip selector 132, base frame selector 134, and feature merger 134 are used individually or in combination with one another to facilitate the creation of a group shot image that includes the best smiles, eyes, and other facial feature attributes from multiple frames of video clip. FIGS. 2-5 illustrate examples and exemplary processes that use one or more of these modules to facilitate the creation of a group shot image.

Figure 2:
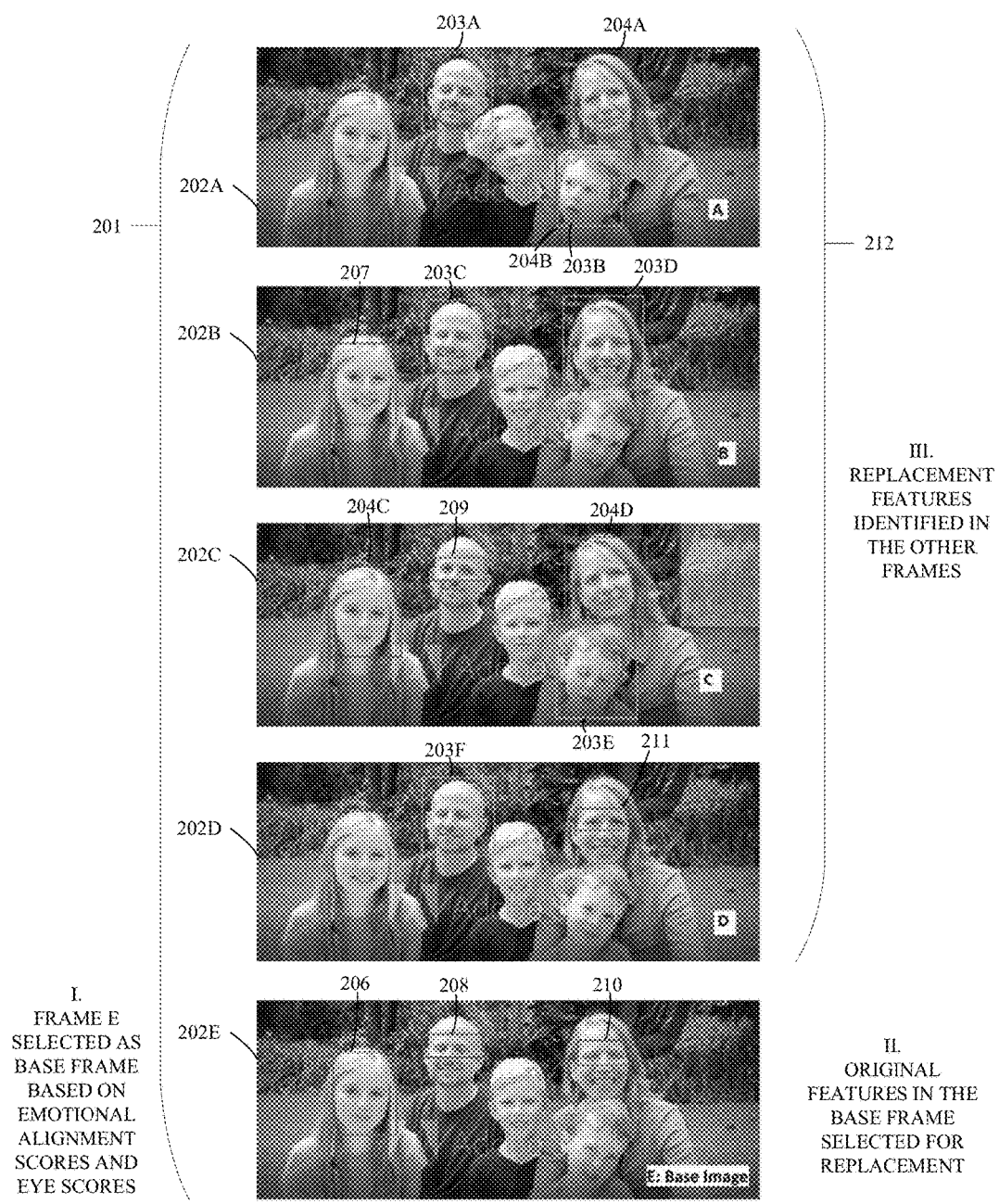
FIG. 2 illustrates a graphical depiction of a video clip of multiple frames used to create a group shot image.

FIG. 2 illustrates a graphical depiction of a video clip 201 of multiple frames 202A-E being used to create a group shot image. This example illustrates a three-step process in which, in the first step, frame 202E is selected as the base frame based on emotional alignment and eye scores. In this example, the process determines an emotional characteristic for the group shot image to have (i.e., happy) and assesses the faces in each of the frames to determine faces that are not aligned with this emotional characteristic (e.g., neutral and sad faces). In this example, graphical indicators 204A-D identify faces in the frames that are not aligned with the emotional characteristic. Such determinations can be based by one or more automated processes that assess the faces. Various techniques can be used. One such technique creates 3-dimensional models of the faces and assesses the emotional characteristic based on the shape of the mouth and/or other features in the model. Another exemplary technique assesses the faces using a trained neural network that receives an input image of a face and outputs an emotional characteristic. Such a neural network is trained with ground truth images for which emotional characteristics are known and used in the training processes.

The base frame selection process also determines eye scores for the faces in the frames. In this example, indicators 203A-F identify faces in the frames 202A-E that have eyes with eye scores that indicate that the eyes are partially opened or closed, as opposed to eyes that are completely open.

The base frame selection process uses the emotional alignment scores and eye scores to select one of the frames as the base frame. In this way, the process comprehensively considers both factors in selecting the best base frame. Weights can be used to weight these and other factors used to select a base frame to suit particular user preferences, image types, and/or other circumstances. The result in the example of FIG. 2, is the selection of FRAME 202E as the base frame.

In the second step of the process illustrated by FIG. 2, original features in the base frame 202E are identified for replacement. In this example, indicators 206, 208, and 210 illustrate the features that will be replaced. The other face features are not replaced. The intelligent selection of the base frame can reduce or minimize the number of features to be replaced and/or the extent of change required by such replacements since the selection is configured to determine the best frame to use as the base frame.

In an embodiment of the invention, the original features of the base frame 202E selected for replacement can be selected based on comparing the features to one or more thresholds or other criteria. For example, the girl's face identified by indicator 206 can be selected based on an automatic process that determines that the girl's face exhibits an emotional characteristic that is not aligned with a desired emotional characteristic. Similarly, the man's eyes identified by indicator 208 are determined to be closed and thus identified for replacement. Finally, the woman's eyes identified by indicator 210 are determined to be partially open and thus also identified for replacement.

In the third step, replacement features are identified in the other frames 202A-D to be used to replace the original features (those identified by indicators 206, 208, and 210) in the base frame 202E that were identified for replacement. In this example, the face of the girl in frame 202B identified by indicator 207 will be used to replace the face of the girl in the base frame 202E. The eyes of the man in frame 202C identified by indicator 209 will be used to replace the eyes of the man in the base frame 202E. The eyes of the woman in frame 202D will be used to replace the eyes of the man in the base frame 202E.

In the example of FIG. 2, while no individual frame has perfect facial features for all of the people in the group, the process is able to create a group shot image based on an intelligently selected base frame and merging features from the other frames.

Figure 3:
FIG. 3 illustrates a graphical depiction of a group shot image created using the video clip of FIG. 2.

FIG. 3 illustrates a graphical depiction of a group shot image 301 created using the video clip of FIG. 2 and the process described with respect to FIG. 2. Such an image is created with little or no manual effort on the part of the user and can be created even by unsophisticated photo editing users who are able to simple capture and provide a video recording to an automated tool offered by a photo editing process to achieve the creation of a desirable group shot image.

Figure 4:
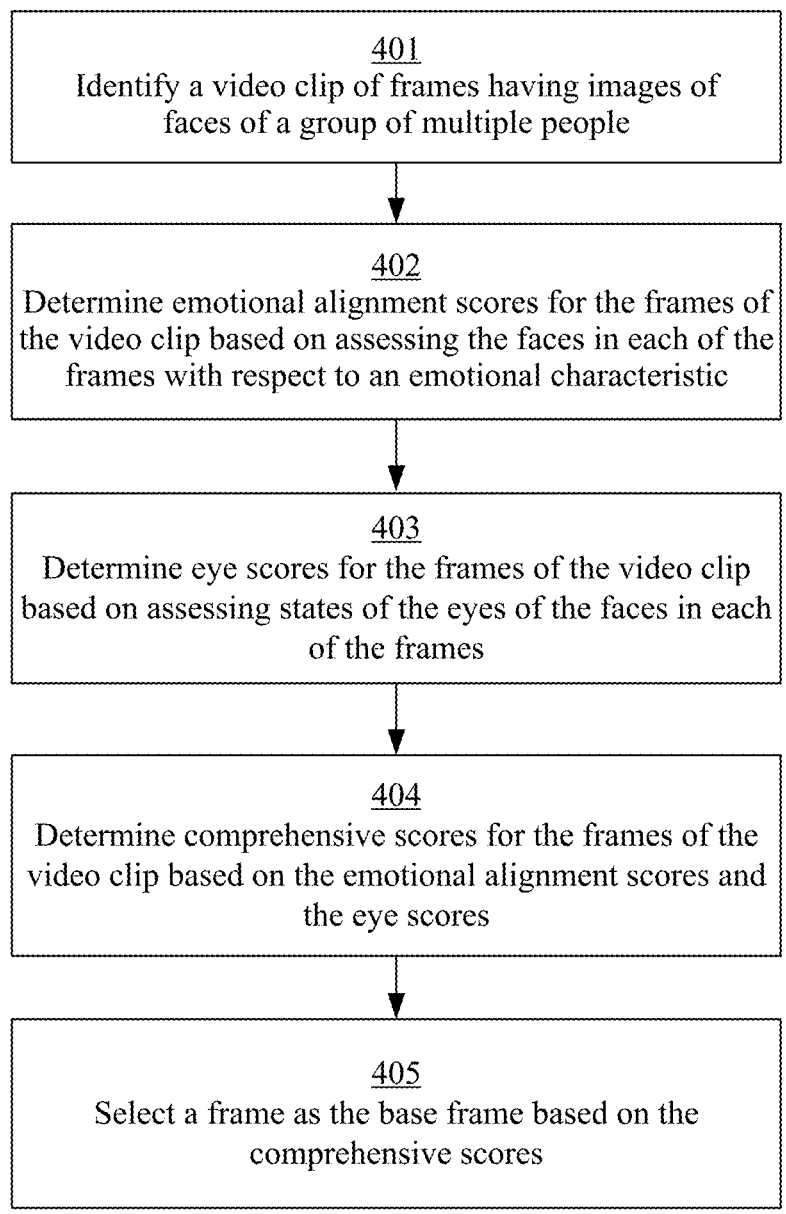
FIG. 4 is a flow chart illustrating an exemplary technique for selecting a base frame from a video clip for a group shot image.

FIG. 4 is a flow chart illustrating an exemplary technique 400 for selecting a base frame from a video clip for a group shot image. The exemplary technique 400 is described in the context of implementation via one or more modules of an application, such as a photo editing application, although other devices and configurations can also be used to implement the technique 400. The exemplary technique 400 can be implemented by storing and executing instructions in a non-transitory computer-readable medium. Reference to the technique 400 being performed by a computing device includes the technique 400 being performed by one or more computing devices.

The technique 400 involves identifying a video clip of frames having images of faces of a group of multiple people, as illustrated in block 401. In an embodiment of the invention, the video clip is identified by a user, for example, based on the user selecting a storage location of the video clip. In another embodiment of the invention, the video clip is identified through an automated or semi-automated process that analyzes a longer video recording to identify the video clip.

In an embodiment of the invention, the identification of the video clip is based on an automatic process that identifies related content in a segment of video based on scene detection, facial detection, facial recognition, and/or content tagging. The following process provides an example of such a technique. This example process involves identifying scene changes in the video to divide the video into segments S1, S2, S3, etc. Based on face detection, the process next determines the number of faces in each frame in the segments. This face detection date is used to determine consecutive frames in which the number of faces changes. Such changes in the number of faces are used to further divide the video into face segments F1, F2, F3, etc. A similar technique can be used to further divide the video based on changes on which objects are present in consecutive frames. The scene, face, and object-based segments are then merged to create merged segments M1, M2, M3, etc., where each of these merged segments has similar content within the segments (e.g., the same number of faces, the same objects, and the same scene) but differs from the other merged segments with respect to at least one of these aspects. Each of these merged segments can be used as a video clip input in an automated process to create a group shot image. In an embodiment of the invention, a photo editing application performs the above-described segmentation process and presents the identified segments, e.g., an image representing each segment, to allow the user to select which of the segments to use as input to automatically create a group shot image.

Various techniques can be used to identify the video clip. Generally, the video clip contains frames from 1 to n that captures a group shot of multiple people. The people in the group shot can be identified using scene and face detection and tracking. The video clip can, but does not necessarily, have frames that have the same number of people/faces. The positions, orientations, and emotions of those faces will differ to varying extents in the frames.

After identifying the video clip, technique 400 determines emotional alignment scores for the frames of the video clip based on assessing the faces in each of the frames with respect to an emotional characteristic, as shown in block 402. In an embodiment of the invention, determining the emotional alignment scores involves determining emotional quotient scores for each of the frames to determine an overall emotional quotient score for the video clip and then determining an emotional alignment score for each of the frames based on how well each frame aligns with that overall score. The following is an example of such a process. This process involves determining emotional quotient scores for each of the faces in each the frames based on classifying the faces in each of the frames based on facial expressions. Facial recognition techniques, including neural network and other machine learning-based techniques, can be used for these classifications. The process next determines emotional quotient scores for the frames based on the classifications of the faces in the frames, for example, based on the number of faces in each frame assigned to one or more particular classifications. Next the process determines an emotional quotient score for the video clip based on the emotional quotient scores for the frames, for example, by combining or averaging the frame scores. The emotional quotient score for the video clip numerically represents an overall emotional mood of the video clip, e.g., whether the video clip is happy, sad, or neutral on a scale of −1 (sad) to 0 (neutral) to 1 (happy). The process determines the emotional alignment scores for the frames by comparing the emotional quotient scores for the frames with the emotional quotient score of the video clip. In an embodiment, the emotional alignment scores for the frames are determined based on how many of the emotional quotient scores of faces in each of the frames align with the emotional quotient score for the video clip.

In addition to determining emotional alignment scores, the technique 400 determines eye scores for the frames of the video clip based on assessing states of the eyes of the faces in each of the frames, as shown in block 403. In an embodiment of the invention, the eye scores are assessed based on whether the eyes of the faces in each of the frames are fully open, partially open, or closed. An embodiment of the invention assesses eye score by comparing the eyes of a person in multiple frames of the video clip, e.g., to compare the number of pixels occupied by the eyes and other characteristics of the eyes in the different frames. Another exemplary technique involves using other facial features as references to assess the eye state. For example, if a nose and lips are detected but no eyes, an eye closed score can be assigned.

The technique 400, determines comprehensive scores for the frames of the video clip based on the emotional alignment scores and the eye scores, as shown in block 404. For example, the emotional alignment scores and the eye scores can be added together to form the comprehensive scores or combined according to predetermined weights. Such weights can be determined based on particular user preferences, particular image types, and/or other particular circumstances. The technique 400 selects a frame as the base frame based on the comprehensive scores, as shown in block 405. For example, the frame having the highest comprehensive score and thus the best combination of emotional alignment and eye attributes can be selected as the base frame for the creation of the group shot image.

The following illustrates a particular implementation of the technique 400 of FIG. 4. In this example, let the total number of faces in each frame be 't' (where t>0). The process first determines the mood/emotion of the people in the clip. This is achieved by iterating over each frame and classifying, for each face 'j' in the current frame 'i', his/her emotion as happy, sad, or neutral. The happy classification is used for faces having a facial expression that is determined to be smiling, laughing, etc. A face having this classification will be assigned an EQji score of '1'. The sad classification is used for faces having a facial expression that is determined to be frowning, crying, showing anger, etc. A face having this classification will be assigned a EQji score of '−1'. A face having the neutral classification will be assigned a EQi score of '0'. The classification of faces uses a mesh-based technique in an embodiment of the invention. The image of the face is interpreted to define a 3-dimensional mesh that is then used to classify the face. For example, particular distances between point A and point B at the end points of the lips represented in the mesh can be used to identify whether to map to smiling or frowning. Alternative embodiments can use additional and/or different classifications.

Next, the process uses these classifications and scores to determine a cumulative emotional quotient for each frame 'i'. The cumulative EQ score $(EQT_i)=(EQ1_i+EQ2_i+ \ldots +EQt_i)/t$.

The process next determines the emotional quotient of the entire clip as $EQ_{clip}=(EQT_1+EQT_2+ \ldots +EQT_n)/n$. In an example, 'n' is a number of frames in the clip. This provides the total emotional quotient of the entire clip in general. An $EQ_{clip}$ greater than 0 indicates that the mood of the clip is happy (smiling, laughing, etc.). An $EQ_{clip}$ at 0 indicates that the mood of the clip is neutral and an $EQ_{clip}$ that is less than 0 indicates that the mood is sad (frown, anger, crying, etc.).

The process next determines a score for each frame. These frame scores are based on one or more of the following criteria.

The first criteria is based on how many faces are facing towards the camera. This is determined, in an embodiment, by determining eyeball positions and using the eyeball positions to determine whether each face is facing towards or away from the camera. Let $P1_{ij}$ denote the score of a face 'j' as to how much it is focusing towards the camera. The more the face is towards the camera, the greater the value of $P1_i$. The process calculates the total score for all faces based on this parameter $P1_i=(P1_{i1}+P1_{i2}+ \ldots +P1_{it})/t$.

The second criteria is based on how many faces are aligning to the emotional quotient of the video clip. This involves determining, for the current frame 'i', $P2_{ij}$ for each face 'j' as follows. If $EQ_{ij}$ (EQ of face j in frame i) aligns with $EQ_{clip}$, then $P2_{ij}=1$. If $EQ_{ij}$ (EQ of face j in frame i) does not align with $EQ_{clip}$, then $P2_{ij}=0$. Here, aligning refers to both being in the classification range: (i) either both $EQ_{ij}$ and $EQ_{clip}>0$ and hence in 'happy' class; (ii) both $EQ_{ij}$ and $EQ_{clip}=0$ and hence in 'neutral' class; or (iii) both $EQ_{ij}$ and $EQ_{clip}<0$ and hence in 'sad' class. The process calculates the total score for all faces based on this parameter $P2i=(P2_{i1}+P2_{i2}+ \ldots +P2_{it})/t$.

The third criteria is based on the quality of the faces in the frame. Let $P3_i$ be the score of all faces based on quality ($P3_{ij}$) of each face 'j' in the current frame 'i'. Quality here refers to attributes determined based on assessing lighting, exposure, blurriness, brightness, contrast, vibrancy, etc. The process calculates the score for the entire frame for this parameter $P3_i=(P3_{i1}+P3_{i2}+ \ldots +P3_{it})/t$.

The fourth criteria provides an eye score and is based on whether the eyes of each face are open, closed, etc. Let $P4_{ij}$ be the score of face 'j' in the current frame 'i' based on this parameter and its value would be as follows: (i) if the eyes are fully open $-P4_{ij}=1$; (ii) if the eyes are partially open $-P4_{ij}=0.5$; and (iii) if the eyes are closed completely $-P4_{ij}=0$. The process calculates the total score for all faces based on this parameter $P4_i=(P4_{i1}+P4_{i2}+ \ldots +P4_{it})/t$.

A score is determined for each frame based on one or more of these criteria. In an embodiment of the invention, a weighted combination of all four criteria is used. In this embodiment, the net score of each frame is calculated as $P_i=(W_1*P1_i+W_2*P2_i+W_3*P3_i+W_4*P4_i)/(W_1+W_2+W_3+W_4)$, where $W_1$, $W_2$, $W_3$, $W_4$ are weights of the parameters respectively. The process then selects the frame from 1 to n which has a highest score of 'P'. Let such frame number be 'k' and this frame is used as the base frame.

In an embodiment of the invention, the process additionally evaluates all of the faces in the base frame 'k' using the above parameters to determine whether one or more of the features of these faces should be replaced, for example, using the intelligent merging techniques described herein.

Figure 5:
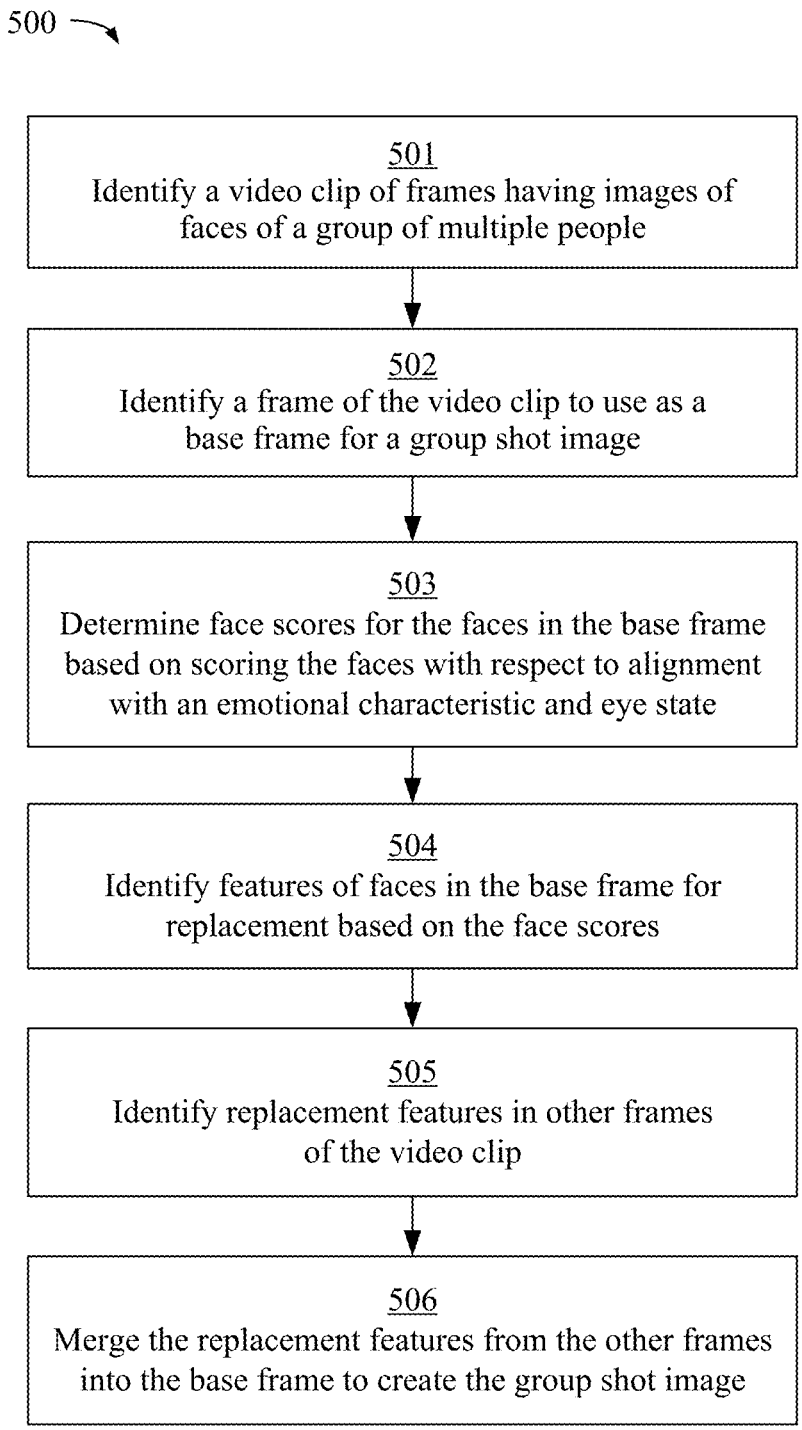
FIG. 5 is a flow chart illustrating an exemplary technique for creating a group shot image based on merging features from multiple frames of a video clip.

FIG. 5 is a flow chart illustrating an exemplary technique 500 for creating a group shot image based on merging features from multiple frames of a video clip. The exemplary technique 500 is described in the context of implementation via one or more modules of an application, such as a photo editing application, although other devices and configurations can also be used to implement the technique 500. The exemplary technique 500 can be implemented by storing and executing instructions in a non-transitory computer-readable medium. Reference to the technique 500 being performed by a computing device includes the technique 500 being performed by one or more computing devices.

The technique 500 involves identifying a video clip of frames having images of faces of a group of multiple people, as shown in block 501. This step can involve similar features as block 401 of FIG. 4 described above. The technique 500 further involves identifying a frame of the video clip to use as a base frame for the group shot image, as shown in block 502. Such a frame can be identified manually, for example, based on user input. Alternatively, such a frame can be identified through an intelligent, automated process, such as using the techniques described with respect to FIG. 4.

The technique 500 determines face scores for each of the faces in the base frame based on scoring the faces with respect to alignment with an emotional characteristic and eye state, as shown in block 502. For example, if the desired emotional characteristic is happy, then any face in the base image that is not aligned with this emotional characteristic can be given a face score that reflects this lack of alignment. Similarly, any face that has partially opened or closed eyes can be given a face score that reflects undesirable eye scores.

The technique 500 next involves identifying features of faces in the base frame for replacement based on the face scores, as shown in block 504. In an embodiment of the invention, this involves comparing the face scores with a threshold such as the average face score of all faces in the base frame, and identifying all of the faces that have scores below the threshold for replacement.

The technique 500 next involves identifying replacement features in other frames of the video clip, as shown in block 505. These features are identified based on various criteria selected to minimize discontinuities and other undesirable visual attributes. For example, features from nearby (e.g., adjacent) frames to the base frame can be preferred since the faces in those frames are more likely to have a consistent orientation with respect to the faces of the base frame.

The technique 500 next merges the replacement features from the other frames into the base frame to create the group shot image, as shown in block 506. This merging can involve replacing pixels or groups of pixels from the base frames with pixels or groups of pixels from the replacement frames. Such merging can additionally or alternatively involve blending, smoothing, filtering, or otherwise automatically adjusting the pixels of the base image to ensure continuity and otherwise provide desirable appearance attributes. Embodiments of the invention do not replace the entire face as it is, but instead only replace specific features using changing parameters of a facial mesh. For example, open eyes can be used to replace closed eyes. Thus, even in minor cases when proper alignment is not available in any of the open-eyed frames, the feature replacement technologies are able to appropriately alter the appearance of the base frame.

The following illustrates a particular implementation of the technique 400 of FIG. 4. This example involves determining a cumulative score of each face (1 to t) in the base frame 'k' for all parameters. Thus, in an embodiment of the invention, for a face 'j', the cumulative score in this frame 'k' would be $CS_{jk}=(W_1*P1_{kj}+W_2*P2_{kj}+W_3*P3_{kj}+W_4*P4_{kj})/(W_1+W_2+W_3+W_4)$. The process determines, for all the faces in the base frame 'k', the faces that have a score $CS_j<P_k$.

For each such face, the process determines the nearest frame 'p' in which (i) the cumulative score of this frame 'p' is highest; and (ii) the features (e.g., eyes, mouth, etc.) are completely visible. The process then replaces the replaces the facial features of the face from frame 'p' to frame 'k' so that the new merged frame 'k' has best characteristics of this face. This process is repeated for each of the faces in the frame 'k' that is identified for replacement has been replaced. The result is a merged frame 'k' that is expected to have the most desirable facial characteristics from all faces in all of the frames. These processes can be performed to create a group shot image that has the most faces with the best facial features. Moreover, the intelligent selection of a base frame and intelligent merging minimizes the amount of merging of facial features and thus provides accuracy and quality. In addition, since the techniques use the same person's facial features, the output looks natural.

Embodiments of the invention provide an easy way of correcting very common user problems of closed eyes and inconsistent emotional displays in portrait photography. Moreover, for a group photograph with multiple faces that must have desirable facial features (aligned, eyes open, smiling, etc.), even a professional photo editor would take a lot of time. Embodiments of the invention provide an automated and more accurate solution to achieving the desirable facial features that can be used by both sophisticated and unsophisticated users with minimal effort. In an embodiment, a user is able to provide a video and select a single user interface command to create a group shot image based on automatic intelligent base image selection and feature merging.

Exemplary Computing Environment

Figure 6:
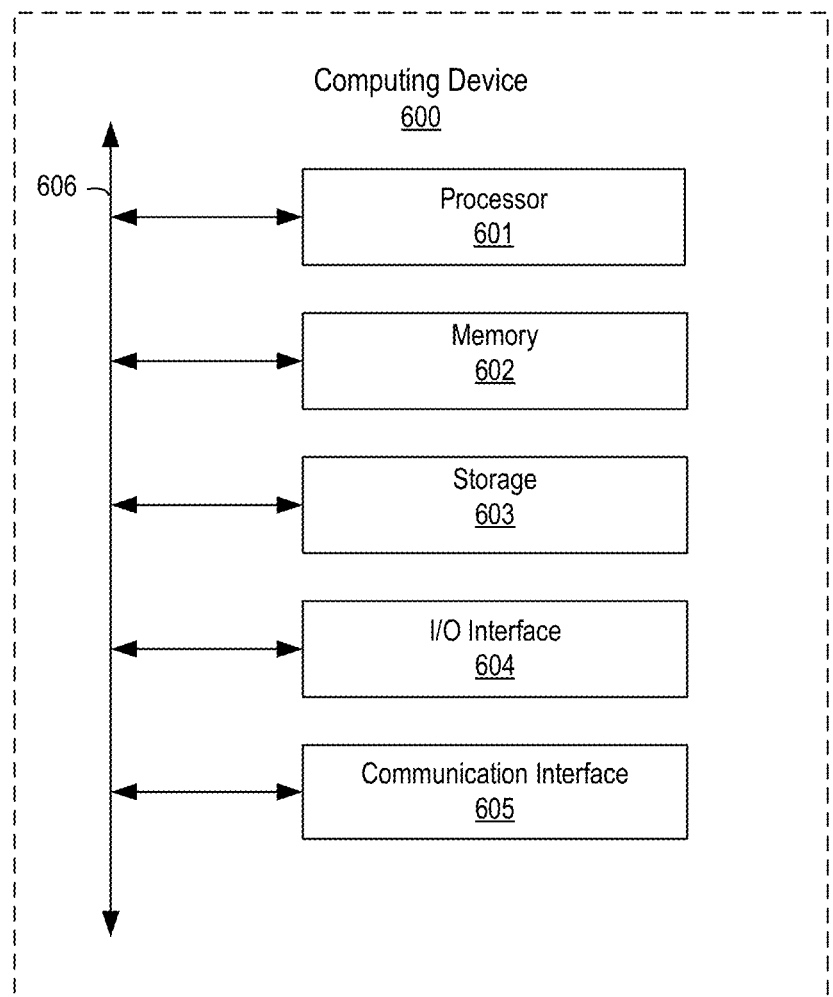
FIG. 6 is a block diagram depicting an example hardware implementation.

Any suitable computing system or group of computing systems can be used to implement the techniques and methods disclosed herein. For example, FIG. 6 is a block diagram depicting examples of implementations of such components. The computing device 600 can include a processor 601 that is communicatively coupled to a memory 602 and that executes computer-executable program code and/or accesses information stored in memory 602 or storage 603. The processor 601 can comprise a microprocessor, an application-specific integrated circuit ("ASIC"), a state machine, or other processing device. The processor 601 can include one processing device or more than one processing device. Such a processor can include or can be in communication with a computer-readable medium storing instructions that, when executed by the processor 601, cause the processor to perform the operations described herein.

The memory 602 and storage 603 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions can include processor-specific instructions generated by a compiler and/or an interpreter from code written in any suitable computer-programming language, including, for example, C, C+ . . . +, C#, Visual Basic, Java, Python, Perl, JavaScript, and ActionScript.

The computing device 600 can also comprise a number of external or internal devices such as input or output devices. For example, the computing device is shown with an input/output ("I/O") interface 604 that can receive input from input devices or provide output to output devices. A communication interface 605 can also be included in the computing device 600 and can include any device or group of devices suitable for establishing a wired or wireless data connection to one or more data networks. Non-limiting examples of the communication interface 605 include an Ethernet network adapter, a modem, and/or the like. The computing device 600 can transmit messages as electronic or optical signals via the communication interface 605. A bus 606 can also be included to communicatively couple one or more components of the computing device 600.

The computing device 600 can execute program code that configures the processor 601 to perform one or more of the operations described above. The program code can include one or more modules. The program code can be resident in the memory 602, storage 603, or any suitable computer-readable medium and can be executed by the processor 601 or any other suitable processor. In some Techniques, modules can be resident in the memory 602. In additional or alternative Techniques, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter can be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more Techniques of the present subject matter. Any suitable programming, scripting, or other type of language or combinations of languages can be used to implement the teachings contained herein in software to be used in programming or configuring a computing device.

Techniques of the methods disclosed herein can be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values can, in practice, be based on additional conditions or values beyond those recited. Headings, lists, and numbering included herein are for ease of explanation only and are not meant to be limiting.

While the present subject matter has been described in detail with respect to specific Techniques thereof, it will be appreciated that those skilled in the art, upon attaining an understanding of the foregoing, can readily produce alterations to, variations of, and equivalents to such Techniques. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for automatically creating a group shot image based on intelligent selection of a frame from a video clip, the method comprising:
    identifying a video clip of frames comprising images of faces of a group of multiple people;
    determining emotional alignment scores for the frames of the video clip based on assessing the faces in each of the frames with respect to an emotional characteristic, including determining an emotional quotient score for the video clip based on emotional quotient scores for the frames, wherein the emotional quotient score for the video clip numerically represents an overall emotional mood of the video clip;
    determining eye scores for the frames of the video clip based on assessing states of the eyes of the faces in each of the frames;
    determining comprehensive scores for the frames of the video clip based on the emotional alignment scores and the eye scores; and
    creating a group shot image, wherein creating the group shot image comprises selecting a frame from the video clip based on the comprehensive scores determined for the frames of the video clip.

2. The method of claim 1 further comprising determining face direction scores for the frames of the video clip based on assessing directions that the faces in each of the frames are facing, wherein determining the comprehensive score is further based on the face direction scores.

3. The method of claim 1 further comprising determining face quality scores for the frames of the video clip based on assessing lighting, exposure, or blurriness of the faces, wherein determining the comprehensive score is further based on the face quality scores.

4. The method of claim 1, wherein determining the emotional alignment scores for the frames comprises:
    determining emotional quotient scores for the faces in the frames based on classifying the faces in each of the frames based on facial expressions;
    determining the emotional quotient scores for the frames based on the classifications of the faces in the frames; and
    determining the emotional alignment scores for the frames by comparing the emotional quotient scores for the faces in the frames with the emotional quotient score of the video clip.

5. The method of claim 4, wherein determining the emotional alignment scores for the frames comprises determining how many of the emotional quotient scores of faces in each of the frames align with the emotional quotient score for the video clip.

6. The method of claim 4, wherein the emotional quotient for the video clip numerically represents whether the video clip is happy, sad, or neutral.

7. The method of claim 1, wherein determining the eye scores for the frames of the video clip comprises assigning the eye scores based on whether the eyes of the faces in each of the frames are fully open, partially open, or closed.

8. The method of claim 1, wherein determining the comprehensive scores for the frames of the video clip comprises combining the emotional alignment scores and the eye scores according to predetermined weights.

9. The method of claim 1, wherein creating the group shot image further comprises:
    identifying features of faces in the frame from the video clip for replacement; and replacing the features of the faces using features of faces in one or more other frames in the clip.

10. The method of claim 1, wherein identifying the video clip of frames comprises identifying a subset of frames of a video in which a same number of faces are depicted.

11. A non-transitory computer readable medium comprising instructions for causing a computing device to:
  identify a video clip of frames comprising images of faces of a group of multiple people;
  determine emotional alignment scores for the frames of the video clip based on assessing the faces in each of the frames with respect to an emotional characteristic, including determining an emotional quotient score for the video clip based on emotional quotient scores for the frames, wherein the emotional quotient score for the video clip numerically represents an overall emotional mood of the video clip;
  determine eye scores for the frames of the video clip based on assessing states of the eyes of the faces in each of the frames;
  determine comprehensive scores for the frames of the video clip based on the emotional alignment scores and the eye scores; and
  create a group shot image, wherein creating the group shot image comprises selecting a frame from the video clip based on the comprehensive scores determined for the frames of the video clip.

12. The non-transitory computer readable medium of claim 11, wherein the instructions further cause the computing device to determine face direction scores for the frames of the video clip based on assessing directions that the faces in each of the frames are facing, wherein determining the comprehensive score is further based on the face direction scores.

13. The non-transitory computer readable medium of claim 11, wherein the instructions further cause the computing device to determine face quality scores for the frames of the video clip based on assessing lighting, exposure, or blurriness of the faces, wherein determining the comprehensive score is further based on the face quality scores.

14. The non-transitory computer readable medium of claim 11, wherein the instructions further cause the computing device to determine the emotional alignment scores for the frames including:
  determining emotional quotient scores for the faces in the frames based on classifying the faces in each of the frames based on facial expressions;
  determining the emotional quotient scores for the frames based on the classifications of the faces in the frames; and
  determining the emotional alignment scores for the frames by comparing the emotional quotient scores for the faces in the frames with the emotional quotient score of the video clip.

15. The non-transitory computer readable medium of claim 14, wherein the instructions further cause the computing device to determine the emotional alignment scores for the frames including determining how many of the emotional quotient scores of faces in each of the frames align with the emotional quotient score for the video clip.

16. The non-transitory computer readable medium of claim 14, wherein the emotional quotient for the video clip numerically represents whether the video clip is happy, sad, or neutral.

17. The non-transitory computer readable medium of claim 11, wherein the instructions further cause the computing device to determine the eye scores for the frames of the video clip including assigning the eye scores based on whether the eyes of the faces in each of the frames are fully open, partially open, or closed.

18. The non-transitory computer readable medium of claim 11, wherein the instructions further cause the computing device to create the group shot image including:
  identifying features of faces in the frame from the video clip for replacement; and
  replacing the features of the faces using features of faces in one or more other frames in the clip.

19. A system for automatically creating a group shot image based on intelligent selection of a frame from a video clip, the system comprising:
  at least one processor; and
  a non-transitory computer-readable storage medium comprising instructions that, when executed by the at least one processor, cause the at least one processor to
  identify a video clip of frames comprising images of faces of a group of multiple people;
  determine emotional alignment scores for the frames of the video clip based on assessing the faces in each of the frames with respect to an emotional characteristic, including determining an emotional quotient score for the video clip based on emotional quotient scores for the frames, wherein the emotional quotient score for the video clip numerically represents an overall emotional mood of the video clip;
  determine eye scores for the frames of the video clip based on assessing states of the eyes of the faces in each of the frames;
  determine comprehensive scores for the frames of the video clip based on the emotional alignment scores and the eye scores; and
  create a group shot image, wherein creating the group shot image comprises selecting a frame from the video clip based on the comprehensive scores determined for the frames of the video clip.

20. The system of claim 19, wherein the video clip of frames is identified including identifying a subset of frames of a video in which a same number of faces are depicted.

* * * * *